US009778760B1

(12) United States Patent
Huang et al.

(10) Patent No.: US 9,778,760 B1
(45) Date of Patent: Oct. 3, 2017

(54) MAGNETIC DETENT FOR INPUT CONTROLS

(71) Applicant: Microsoft Technology Licensing, LLC, Redmond, WA (US)

(72) Inventors: Xianming Huang, Shenzhen (CN); Kelong Zhao, Shenzhen (CN); Zexin Wu, Shenzhen (CN); David M. Lane, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/064,866

(22) Filed: Mar. 9, 2016

(51) Int. Cl.
*G06F 3/0354* (2013.01)
*G06F 3/0362* (2013.01)

(52) U.S. Cl.
CPC ........ *G06F 3/03543* (2013.01); *G06F 3/0362* (2013.01)

(58) Field of Classification Search
CPC ........................... G06F 3/03543; G06F 3/0362
See application file for complete search history.

(56) References Cited

U.S. PATENT DOCUMENTS

| 2004/0119693 | A1  | 6/2004  | Kaemmler |
|---|---|---|---|
| 2006/0001657 | A1* | 1/2006  | Monney ............... G06F 3/03543 345/184 |
| 2007/0188453 | A1* | 8/2007  | O'Sullivan ........... G06F 3/0312 345/163 |
| 2007/0188454 | A1  | 8/2007  | O'Sullivan et al. |
| 2009/0122012 | A1  | 5/2009  | Bohn |
| 2009/0281664 | A1  | 11/2009 | Glandorf |
| 2010/0164908 | A1  | 7/2010  | Hill et al. |
| 2010/0171702 | A1  | 7/2010  | Cheng |
| 2010/0265180 | A1* | 10/2010 | Lu .......................... G06F 3/0317 345/166 |
| 2012/0126919 | A1  | 5/2012  | North et al. |

(Continued)

FOREIGN PATENT DOCUMENTS

| CN | 201054126 | 4/2008 |
|---|---|---|
| EP | 0520089 | 12/1992 |
| TW | 201020866 | 6/2010 |

OTHER PUBLICATIONS

Jatkinson,"Microsoft Arc Mouse Review", Available at: http://www.extremetech.com/computing/80458-microsoft-arc-mouse-review/2, Oct. 23, 2008, 8 pages.

(Continued)

*Primary Examiner* — Ryan A Lubit

(57) ABSTRACT

Magnetic detents for input controls are described herein. In one or more implementations, a rotary input control (e.g., a scroll wheel or dial) includes a rotor assembly configured to employ a magnetic detent mechanism. The rotary input control may be integrated with an input device such as a computer mouse, keyboard, or, stylus. The rotor assembly includes a rotor that rotates around an axis of rotation and includes multiple magnetic elements disposed around the rotor, such as teeth of a gear, spokes, metallic regions, and so forth. At least one permanent magnet is arranged radially outward from the axis of rotation and configured to apply a magnetic field to the magnetic elements. This creates a magnetic detent effect when the rotor is rotated due to changes in rotational resistance produced as the magnetic elements rotate through the magnetic field.

20 Claims, 8 Drawing Sheets

(56) References Cited

U.S. PATENT DOCUMENTS

| | | |
|---|---|---|
| 2012/0229386 A1 | 9/2012 | Chang et al. |
| 2014/0253449 A1 | 9/2014 | Bochniak |
| 2014/0333536 A1 | 11/2014 | Tee et al. |
| 2015/0138093 A1* | 5/2015 | Young .................. G06F 3/0312 |
| | | 345/166 |
| 2016/0109964 A1* | 4/2016 | Wang .................. G06F 3/03543 |
| | | 345/166 |
| 2017/0090572 A1* | 3/2017 | Holenarsipur ........ G06F 3/0362 |

OTHER PUBLICATIONS

Moore,"Review: Hippus HandShoe "gripless" ergonomic mouse", Available at: http://www.technologytell.com/apple/136989/review-hippus-handshoe-gripless-ergonomic-mouse/, Jun. 28, 2014, 14 pages.

Moore,"Logitech MX Anywhere 2 Wireless Mobile Mouse—Book Mystique Review", Available at: http://www.macprices.net/2015/06/17/logitech-mx-anywhere-2-wireless-mobile-mouse-book-mystique-review/, Jun. 17, 2015, 8 pages.

"International Search Report and Written Opinion", Application No. PCT/US2017/020299, dated May 12, 2017, 15 pages.

* cited by examiner

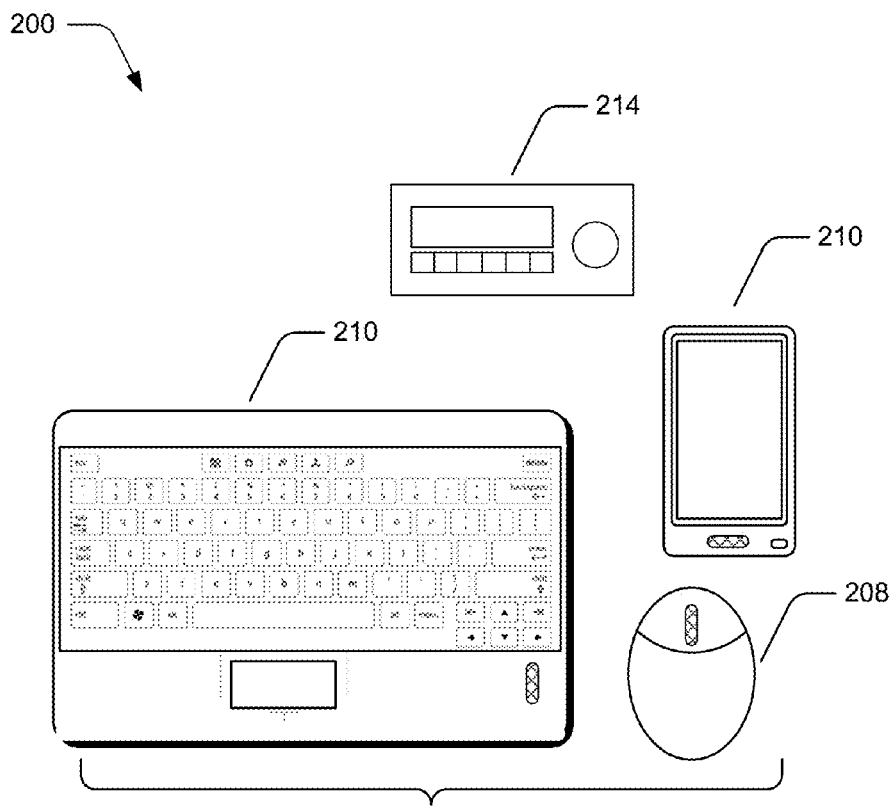
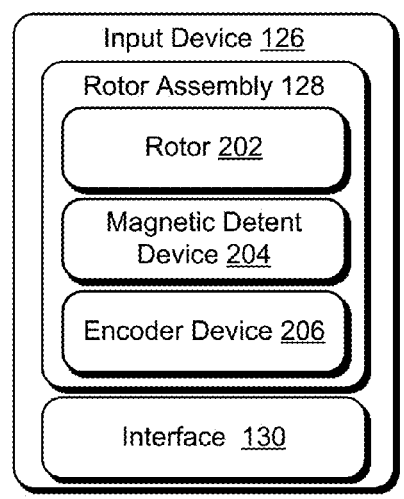

MAGNETIC DETENT FOR INPUT CONTROLS

BACKGROUND

A variety of kinds of computing devices have been developed to provide computing functionality to users in different settings. For example, a user may interact with a mobile phone, tablet computer, wearable device or other computing device to check email, surf the web, compose texts, interact with applications, and so on. Various types of input devices may be employed with the computing devices to enable the user inputs for interaction with the device such as keyboards, trackpads, touchpads, and pointing devices (e.g., a mouse), to name a few examples. Input devices, such as a mouse or keyboard, may include rotary input controls such as a scroll wheel or a dial. Conventional rotary input controls may employ mechanical detent mechanisms to divide rotation into discrete increments. These detent mechanisms provide mechanically produced rotational resistance designed to enhance the tactile "feel" when using the rotary control and enable input to be indexed according to the discrete increments. Since the detent effect is produced mechanically, the rotary action produces noise that may be undesirable in some scenarios. Additionally, friction produced between mechanically engaged components causes the components to wear down over time, which reduces uniformity of the rotation and decreases the product life cycle.

SUMMARY

Magnetic detents for input controls are described herein. In one or more implementations, a rotary input control (e.g., a scroll wheel or dial) includes a rotor assembly configured to employ a magnetic detent mechanism. The rotary input control may be integrated with an input device such as a computer mouse, keyboard, or, stylus. The rotor assembly includes a rotor that rotates around an axis of rotation and includes multiple magnetic elements disposed around the rotor, such as teeth of a gear, spokes, metallic regions, and so forth. At least one permanent magnet is arranged radially outward from the axis of rotation and configured to apply a magnetic field to the magnetic elements. This creates a magnetic detent effect when the rotor is rotated due to changes in rotational resistance produced as the magnetic elements rotate through the magnetic field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 depicts an example implementation of an input device of FIG. 1 in greater detail.

DETAILED DESCRIPTION

Overview

Conventional rotary input controls may employ mechanical detent mechanisms to divide rotation into discrete increments. These detent mechanisms provide mechanically produced rotational resistance designed to enhance the tactile "feel" when using the rotary control and enable input to be indexed according to the discrete increments. Since the detent effect is produced mechanically, the rotary action may produce undesirable noise and friction that reduces uniformity of the rotation and decreases the product life cycle.

Magnetic detents for input controls are described herein. In one or more implementations, a rotary input control (e.g., a scroll wheel or dial) includes a rotor assembly configured to employ a magnetic detent device. The rotary input control may be integrated with an input device such as a computer mouse, keyboard, or, stylus. The rotor assembly includes a rotor that rotates around an axis of rotation and includes multiple magnetic elements disposed around the rotor, such as teeth of a gear, spokes, metallic regions, and so forth. At least one permanent magnet is arranged radially outward from the axis of rotation and configured to apply a magnetic field to the magnetic elements. The magnet(s) may be arranged in various positions such as being aligned outside of the perimeter/rim of the rotor or positioned alongside the rotor. The magnet(s) creates a magnetic detent effect when the rotor is rotated due to changes in rotational resistance produced as the magnetic elements rotate through the magnetic field.

The magnetically created detent effect as discussed herein provides non-contact uniform rotational resistance that improves consistency of torque for each discrete increment and the accuracy of input operations, such as scrolling. Additionally, little or no noise is produced since the detent effect is created without using mechanically engaged components. Friction is also eliminated and accordingly a longer product life cycle can be attained. Tunable adjustment of rotational resistance/scrolling torque is also possible by selectively varying the spacing of the magnet(s) relative to the rotor.

In the discussion that follows, a section titled "Operating Environment" is provided that describes an example environment suitable to employ the magnetic detent for input controls techniques described herein. Following this, a section titled "Magnetic Detent Examples" describes example techniques, devices, arrangements, and details in accordance with one or more implementations. Last, a section titled "Example System" describes example computing systems and devices that can employ magnetic detents in accordance with one or more implementations.

Operating Environment

Figure 1:
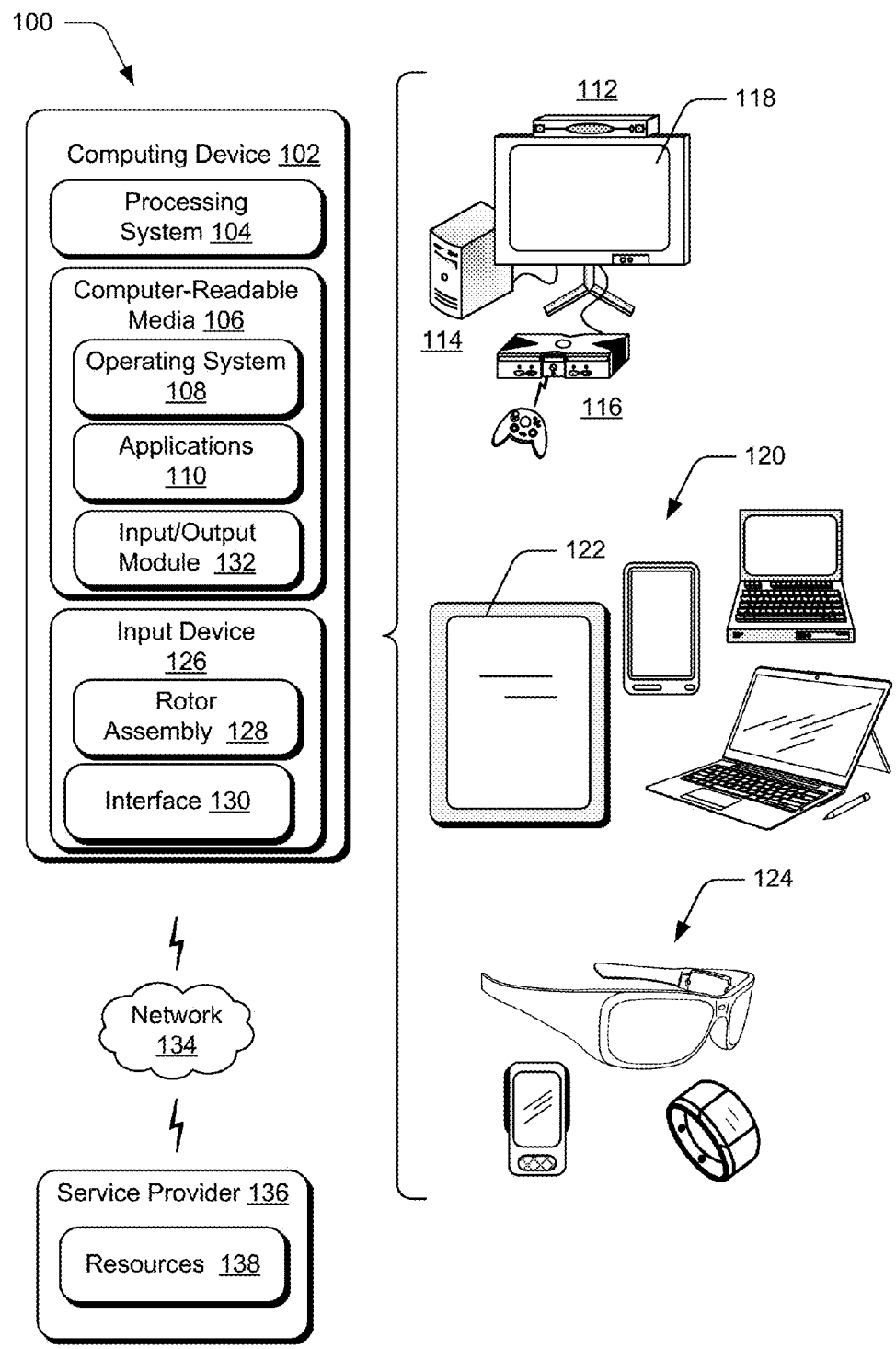
FIG. 1 is an illustration of an example operating environment that is operable to employ the magnetic detent techniques described herein in accordance with one or more implementations.

FIG. 1 illustrates an operating environment in accordance with one or more implementations, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to a ring, an article of clothing, a glove, and a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 8.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 8.

The computing device 102 may include or make use of an input device 126. For example, the computing device 102 may be communicatively coupled to one or more input device 126 via any suitable wired or wireless connection. Input devices include devices integrated with the computing device 102, such as an integrated keyboard, touchpad, track pad, pointer device, a bezel or other touch operable component of a tablet or wearable device, a touch capable display, and so forth. Input devices also include external devices and removably connectable devices such as a mouse, wireless keyboard, removable keyboard/cover combination, a mobile phone, a wearable device used to control the computing device through a wireless connection, an external touchpad, and so forth. Other non-conventional configurations of an input device are also contemplated, such as a game controller, configuration to mimic a musical instrument, and so forth. Thus, the input device 126 and controls incorporated by the input device (e.g., buttons, keys, touch regions, toggles, etc.) may assume a variety of different configurations to support a variety of different functionality.

In accordance with one or more implementations described herein, an input device 126 includes a rotor assembly 128 that implements a magnetic detent effect in accordance with techniques described herein. As introduced above, the rotor assembly 128 includes a rotor having magnetic elements configured to align during rotation with a magnet(s) that produces a magnetic field. When the rotor is rotated, a magnetic detent effect is created due to changes in rotational resistance produced as the magnetic elements rotate through the magnetic field. The rotor assembly 128 may be employed to implement various kinds of rotary input controls for various electronic devices, examples of which include but are not limited to a scroll wheel for a mouse or other input device, a volume dial or other tuning knob for an electronic device; or a control wheel or dial for a home or vehicle entertainment system, to name a few examples. Details regarding these and other aspects of a rotor assembly 128 can be found in the following discussion.

The input device 126 additionally includes an interface 130 connectable to the computing device 102 to enable communication of inputs signals from the input device for processing by the computing device. Input signals conveyed to the computing device include signals generated by operation of a rotor assembly 128 as described above and below. The computing device 102 is further illustrated as including an input/output module 132 configured to process input signals received from the input device 126 and/or other sources. The input/output module 108 is representative of various functionality relating to processing of inputs and rendering outputs of the computing device 102. A variety of different inputs may be processed by the input/output module 132, such as inputs relating to operation of controls of the input device 126, keys of a virtual keyboard, identification of gestures through touchscreen functionality, and so forth. Responsive to the inputs, the input/output module 132 causes corresponding operations to be performed. Thus, the input/output module 132 may support a variety of different input techniques by recognizing and leveraging a division between types of inputs including key presses, gestures, control interaction, and so on.

The environment 100 further depicts that the computing device 102 may be communicatively coupled via a network 134 to a service provider 136, which enables the computing device 102 to access and interact with various resources 138 made available by the service provider 136. The resources 138 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of a magnetic detent for input controls.

Magnetic Detent Examples

FIG. 2 depicts generally at 200 an example implementation of an input device 126 of FIG. 1 in greater detail. In the illustrated example, the input device 126 includes the rotor assembly 128, which may be configured in various ways as described in this document. The input device also includes the interface 130, which represents any suitably configured wired or wireless interface operable to enable connection to and communications with a computing device, including communications to supply inputs signals from the input device for processing by the computing device. The input signals include inputs signals that are generated through operation of the rotor assembly 128.

As depicted, the rotor assembly includes a rotor 202, a magnetic detent device 204, and an encoder 206. The rotor 202 represents a rotary component such as a wheel, disk, dial, gear, or other element configured to rotate about an axis of rotation. The rotor 202 may be configured to rotate around an axle that is formed as an integrated component of the rotor 202, or alternatively as a separate axle component. In implementations, the rotor 202 has a generally circular shape. The rotor may also be formed as or include a gear with a plurality of cut teeth or cogs. Alternatively, the rotor may be implemented using a polygonal shape that has a multi-sided rim. A variety of other rotor configurations are also contemplated.

The rotor 202 is configured to include multiple magnetic elements disposed around the rotor. Various types and arrangements of magnetic elements are contemplated. In implementations, the rotor 202 includes alternating regions of magnetic and non-magnetic material disposed in a radial pattern around the rotor. By way of example, the magnetic elements may include gear teeth or spokes having magnetic character that are integrated with the rotor 202. Gear teeth, spokes, or other magnetic elements may be interspersed in an alternating pattern with non-magnetic portions, which may include open spaces between the magnetic elements or non-magnetic material (e.g., plastic and/or rubber) that fills in gaps between the magnetic elements. Details regarding example implementations of a rotor are discussed below in relation to FIGS. 3A, 3B, and 4.

The magnetic detent device 204 represents functionality to create a magnetic detent effect as the rotor 202 is rotated. The magnetic detent device 204 includes an arrangement of one or more permanent magnets that produces a magnetic field. The arrangement of one or more permanent magnets is located such that magnetic elements of the rotor pass through the magnetic field as the rotor 202 rotates. The magnetic detent effect occurs due to changes in rotational resistance produced as the magnetic elements pass through the magnetic field produces. Example arrangements of permanent magnets are discussed below in relation to FIGS. 7A and 7B.

In particular, the magnetic field established by the magnetic detent device 204 effects rotation of the rotor 202 due to attraction of the magnetic elements to the permanent magnets. Discrete increments in rotation are established by interspersing the magnetic elements in an alternating pattern with non-magnetic portions. Accordingly, input signals produced via the rotor assembly 128 can be indexed according to the discrete increments in a way that is comparable to mechanically produced detent approaches.

In implementations, magnets of the magnetic detent device 204 are located in a fixed position relative to the rotor 202, which produces a consistent tactile "feel" and detent effect (e.g., torque level created by the magnetic field is constant). Alternatively, the magnetic detent device 204 is configured to include an adjuster device operable to selectively vary a level of rotational resistance produced. Various configurations of an adjuster device are contemplated. In one or more implementations, the adjuster device is designed enable different levels or "modes" of rotational resistance by changing spacing of the permanent magnet(s) relative to the rotor and magnetic elements. This change in spacing creates a corresponding change in the magnitude of magnetic torque that is applied and consequently enables selective adjustments to the detent effect. Details regarding implementations of an adjuster device are discussed below in relation to FIGS. 5 and 6.

The encoder device 206 represents functionality of the rotor assembly 128 configured to capture data regarding rotation of the rotor and convert the data into the input signals for communication to the computing device. In particular, the encoder device 206 may be configured in various ways to detect one or more of, position, speed (e.g., rpms), distance traveled, rotor increments, and other parameters related to rotation of the rotor. The encoder device 206 converts input supplied by operation of the rotor assembly 128 into input signals that are conveyed to the computing device 102 (e.g., via the interface 130) for processing and handling via the input/output module 132 or otherwise. Various types of encoder devices are contemplated including but not limited to optical and mechanical encoders typically employed with scroll wheels and other rotary controls. In an implementation, the encoder device 206 may employ a hall effect sensor that is designed to detect rotational parameters based on magnetic field fluctuations that occur as the rotor 202 turns.

As noted, the rotor assembly and magnetic detent techniques as described in this document may be used to input various different types of input controls for various electronic devices. Some illustrative example devices and corresponding controls are represented in FIG. 2. For example, the rotor assembly 128 may be employed to implement a scroll wheel for a mouse 208, keyboard 210, or other input device 126. The rotor assembly 128 may also be used to implement a dial or rotary control from a mobile device 210, such as a mobile phone, tablet, camera, wearable device, or portable digital media player. Further, the rotor assembly 128 may be used in connection with input controls for other electronic devices 214, such as a volume control for an A/V receiver, a dial control of a smart home appliance, a rotary control for a vehicle electronic system, and so forth.

Figure 3A:
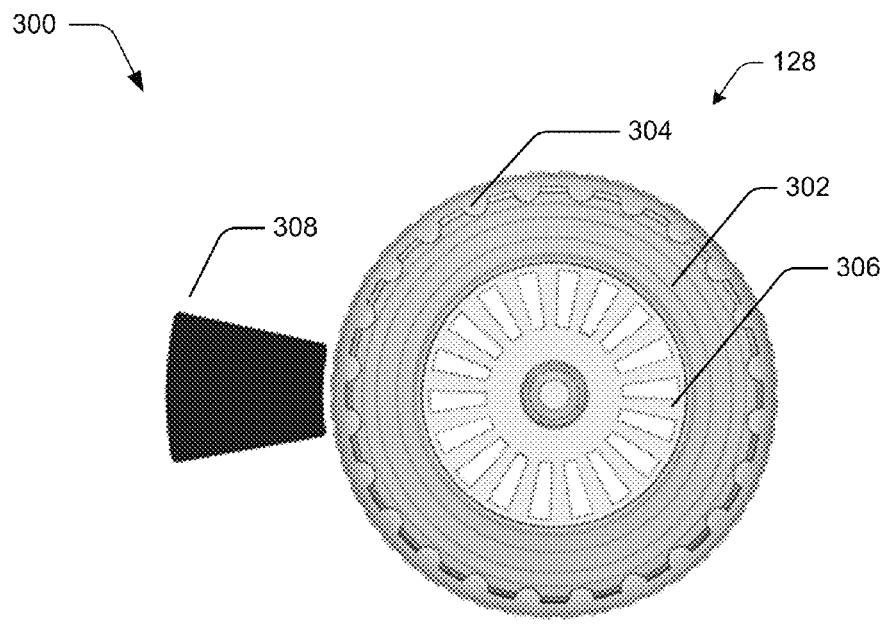
FIGS. 3A and 3B depict respective views of portions of an input device of FIG. 1 showing an example rotatory assembly in accordance with one or more implementations.
Figure 3B:
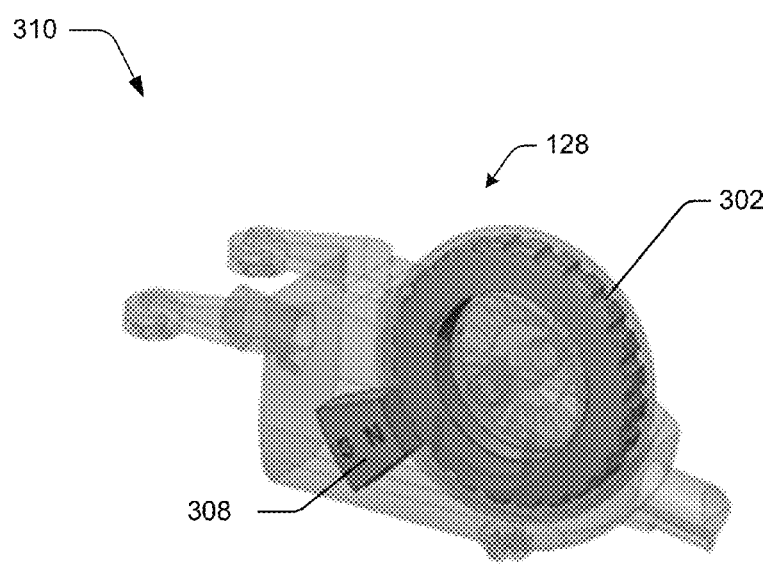
Figure 4:
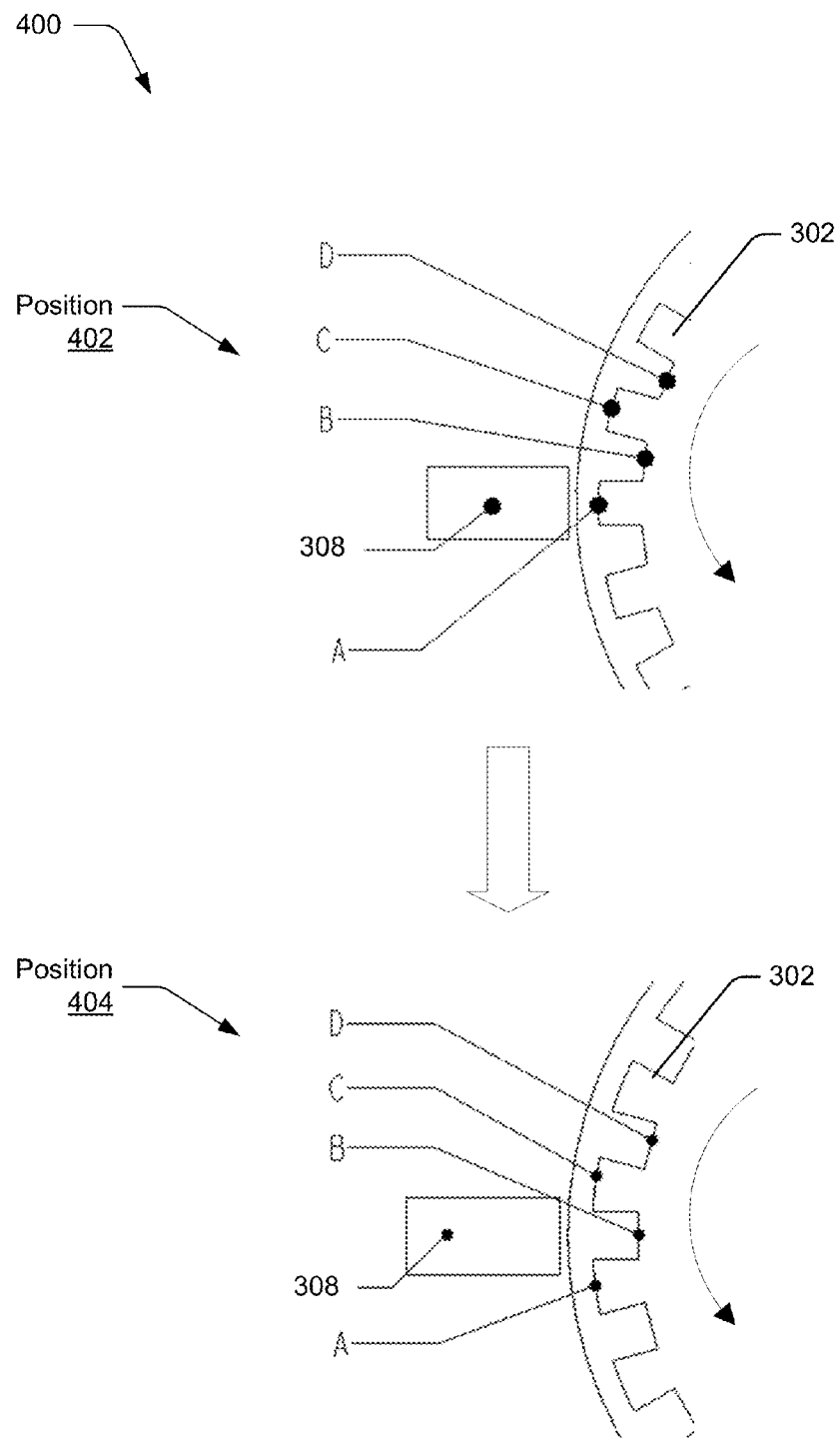
FIG. 4 represents an example scenario for operation of an input control that employs a magnetic detent in accordance with one or more implementations.

Consider now details regarding example implementations of a rotor assembly discussed in relation to examples of FIGS. 3A, 3B, and 4. In particular, FIG. 3A depicts generally at 300 a side view of a rotor assembly 128 for an input device 126 in accordance with one or more implementations. In this example, the rotor assembly 128 corresponds to a scroll wheel for an input device 126, such as a computer mouse or keyboard. Although a scroll wheel is discussed, comparable features and components may be employed to implement other types of rotary controls for different kinds of devices, examples of which are provided throughout this document. In the example of FIG. 3A, the rotor assembly 128 includes a rotor in the form of gear 302 having an arrangement of teeth or other magnetic elements. The gear may be constructed of iron or other material having magnetic character. The gear may be encased in a non-magnetic material 304 such as a plastic or rubber cover. Consequently, the teeth along with the surrounding material form an alternating arrangement of magnetic and non-magnetic (or reduced magnetic) material. Other arrangements are also contemplated, such as a wheel having magnetic spokes, a disc with magnetic inserts spaced around the disc and so forth.

With respect to the gear 302, the magnetic elements correspond to teeth that are disposed circumferentially at or near to a rim of the scroll wheel. In other arrangements, magnetic elements may be disposed radially toward the interior of the rotor/wheel, as represented by the example spokes 306 shown in FIG. 3A. Generally, multiple magnetic elements are spaced equally around the rotor/wheel. The magnetic elements are disposed to create multiple discrete points of magnetic resistance around the rotor. Additionally, the rotor assembly 128 includes a magnetic detent device 204 that is designed to align with magnetic elements to provide rotational resistance as the rotor/wheel turns in the manner described herein.

In the represented example, the magnetic detent device 204 is configured as a permanent magnet 308 located radially outward from the axis of rotation of the rotor/wheel. As discussed, a magnetic detent device 204 may include an arrangement of one or more magnets positioned to apply a magnetic field to the magnetic elements when a corresponding rotor is rotated. In the context of the example scroll wheel of FIG. 3A, the permanent magnet 308 is configured to align with teeth of the gear 302 as the scroll wheel is turned. This creates the magnetic detent effect due to changes in rotational resistance produced as the magnetic elements (e.g., the teeth) pass through the magnetic field. In particular, the detent effect is produced under the influence of the magnetic field based on rotational torque differences existing between alignment of the permanent magnet 308 with teeth and alignment of the permanent magnet with gaps or non-magnetic material in-between teeth.

As represented, the permanent magnet 308 is spaced apart from the rotor (e.g., scroll wheel) radially outside of a rim of the rotor in a position to align with the magnetic elements (e.g., teeth) disposed around the rotor proximate to the rim. In this arrangement, the permanent magnet 308 may be centered roughly in alignment with a central point of the axis of rotation and spaced a distance out from the rim. The magnet may have a curved or arced surface that aligns concentrically with the rim. Alternatively, the magnet may have a flat surface that is aligned approximately parallel to a line tangent to the rim.

In addition, or alternatively, a permanent magnet 308 may be spaced apart from the rotor at a position along a side of the rotor. In this approach, at least one magnet is positioned parallel to the axis of rotation and radially inside the rim of the rotor. The permanent magnet 308 positioned in this manner is configured to align with the magnetic elements along the side of the rotor at a defined distance from the center of the rotor.

Further, a pair of magnets may be arranged on opposing sides of the rotor in some scenarios. For instance, the rotor assembly 128 may include a first permanent magnet at position along one side of the rotor as just described and an additional permanent magnet arranged at a corresponding position along an opposing side of rotor. In this scenario, the magnetic field and changes in rotational resistance are produced by combined effects of the pair of magnets upon opposing sides of the rotor.

In general, one or multiple permanent magnets may be arranged in various combinations to implement a magnetic detent device 204. Magnets may be located in fixed positions relative to the rotor 202. As noted above, though, the magnetic detent device 204 may implement adjuster devices for one or more of the magnets. An adjuster device is operable to vary the position of a corresponding magnet to selectively move the magnet closer to or farther from the rotor. Changing the distance of a permanent magnet relative to the rotor produces a corresponding change in rotational resistance that is applied to the rotor by the magnet.

FIG. 3B depicts generally at 310 a perspective view of the rotor assembly 128 of FIG. 3A in accordance with one or more implementations. FIG. 3B provides another view of an arrangement of the permanent magnet 308 in a fixed position relative to the gear 302 of the rotary assembly 128. As the gear 302 is turned, different teeth of the gear become aligned with the permanent magnet 308. The rotational resistance for the magnetic detent is created due to variation in torque as the gears and gaps between teeth alternately align with the permanent magnet 308.

In this context, FIG. 4 depicts generally at 400 an example scenario for operation of an input control that employs a magnetic detent in accordance with one or more implementations. In particular, FIG. 4 is a diagram that represents movement of a gear 302 of a rotary assembly 128 between different positions indicated as position 402 and position 404. In the depicted example, a plurality of teeth and gaps of the gear 302 are labeled using letters A through D. In position 402, tooth A of the gear is depicted as being aligned with the permanent magnet 308. This is a stable position due to the attraction of the magnet to the gear. During operation of the rotary assembly 128 for scrolling or other input action, the gear 302 turns and the permanent magnet 308 becomes aligned with gap B between teeth A and C. This alignment with gap B is an unstable position since the magnetic field tends to pull the wheel further into alignment with tooth C. Consequently, the rotational torque climbs up in the unstable position. As rotation continues to a point where tooth C is aligned with the magnet, the rotational torque drops back down accordingly. The magnetic detent effect as discussed herein is due to such changes in torque (e.g., changes in rotational resistance) that occur as magnetic elements of a rotor pass through the magnetic field off the permanent magnet 308. Generally, the torque changes occur in a periodic or oscillating pattern corresponding to the alternating pattern of magnetic and non-magnetic elements.

As noted, implementations of a rotary assembly 128 may include or make use of an adjuster device in connection with one or more permanent magnets. The adjuster device is designed to vary spacing between a magnet(s) controlled by the adjuster device and the rotor 202. This causes corresponding changes in the level of torque and rotational resistance applied to the rotor 202. Consequently, the adjuster device may be used to selectively vary the resistance in different scenarios. In addition, or alternatively, different modes of operation may be defined and mapped to respective levels of torque/resistance and corresponding spacing between the magnet(s) and rotor. For example, one or multiple detent modes that provide different levels of detent feeling may be defined. Additionally, a fast scroll or "hyper" mode may be defined in which the level of detent effect is reduced substantially. In the hyper mode, the rotor turns with effectively no additional resistance due to the arrangement of magnets. In other words, the detent effect is deactivated in hyper mode. Various different modes, including but not limited to the enumerated examples, may be selectively activated and deactivated in response to different criteria and for different interaction scenarios.

Figure 5:
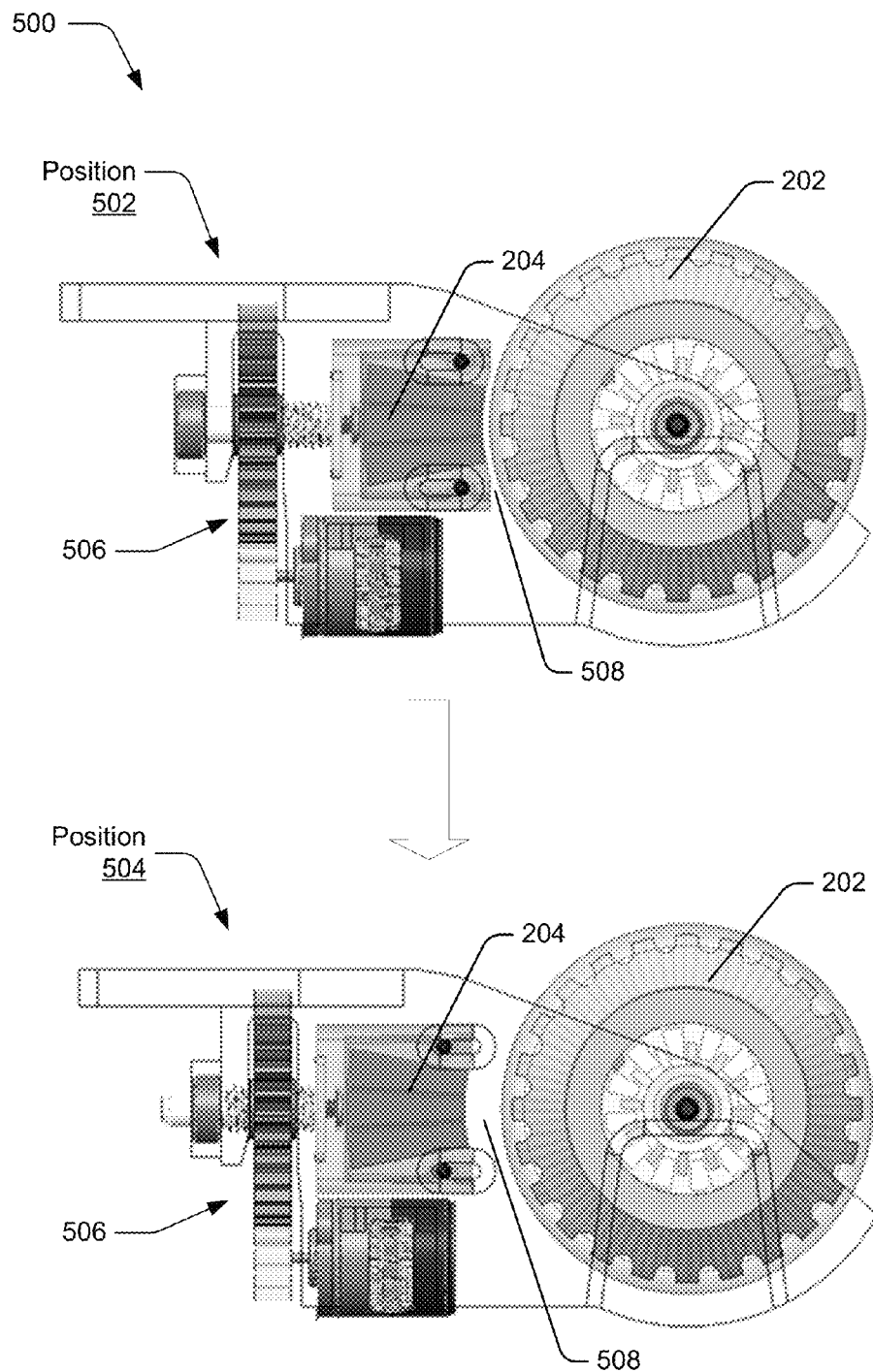
FIG. 5 depicts a representative arrangement and scenario for a torque adjustable rotary assembly in accordance with one or more implementations.
Figure 6:
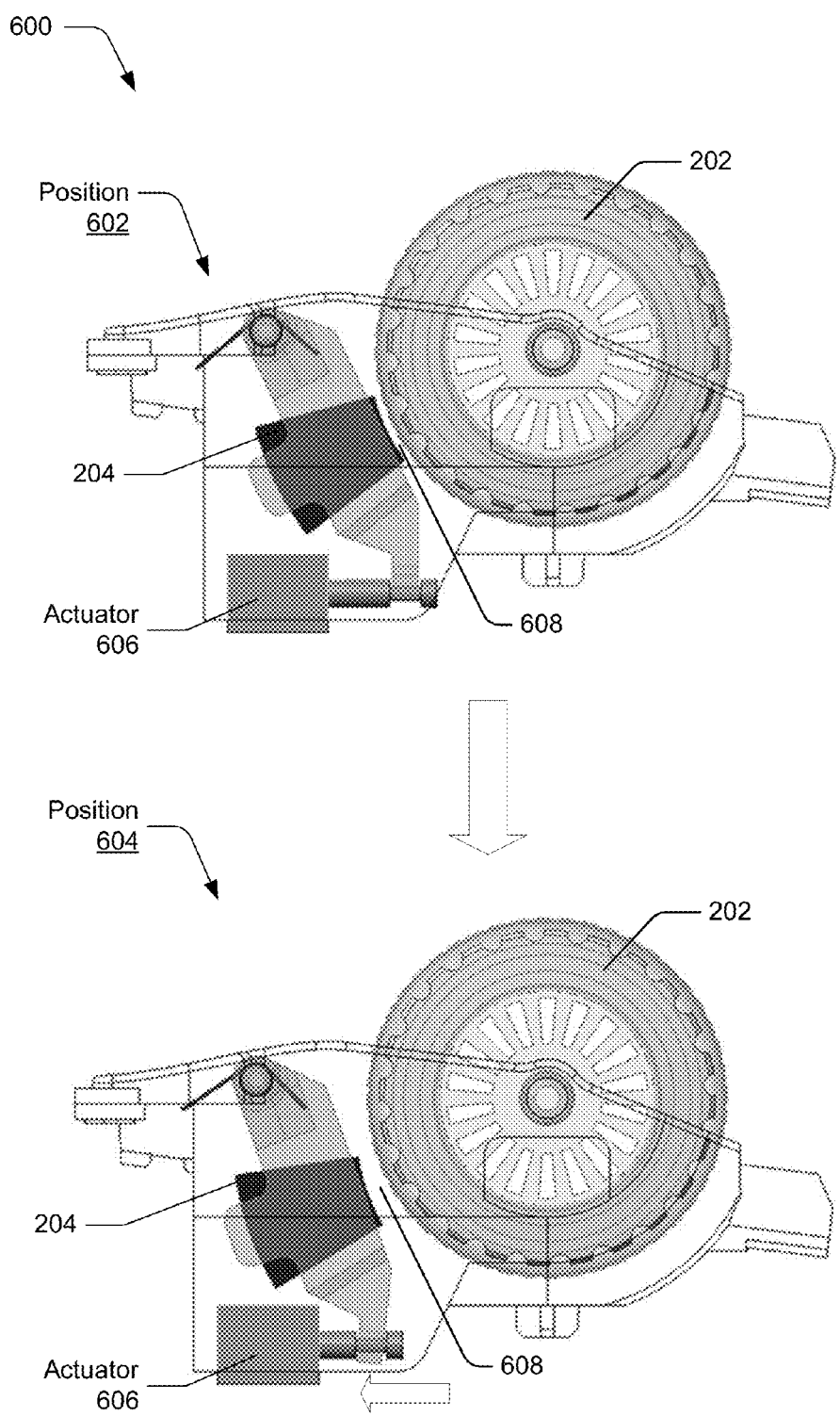
FIG. 6 depicts another representative arrangement and scenario for a torque adjustable rotary assembly in accordance with one or more implementations.

Illustrated examples of adjuster devices are depicted and described in relation to FIG. 5 and FIG. 6. In particular, FIG. 5 depicts generally at 500 a representative arrangement and scenario for a torque adjustable rotary assembly in accordance with one or more implementations. FIG. 5 represents movement of a magnetic detent assembly 204 of a rotary assembly 128 between different positions indicated as position 502 and position 504 due to operation of an adjuster device. In this example, an adjuster device in the form of a torque adjusting gear 506 that is connected to magnetic detent assembly 204 and configured to drive the magnetic detent assembly 204 into different positions relative to the rotor 202 using mechanical gear action. The detent effect, though, is still produced magnetically.

In position 502, the torque adjusting gear 506 moves the magnetic detent assembly 204 relatively close to the rotor 202 such that spacing 508 between the magnetic detent assembly 204 and rotor 202 is relatively small. On the other hand, in position 504, the torque adjusting gear 506 moves the magnetic detent assembly 204 away from the rotor 202 such that spacing 508 between the magnetic detent assembly 204 and rotor is relatively large. The effect of the magnetic field applied by the magnetic detent assembly 204 diminishes as distance increases. Consequently, the detent effect is greater in position 502 than in position 504. Various intermediate positions may provide intermediate levels of detent effect between those attained in position 502 and position 504. Modes of operations for the rotary assembly 128 as noted above may be defined to correspond to respective positions that are achieved through setting of the torque adjusting gear 506 to vary the spacing between the magnetic detent assembly 204 and rotor 202 accordingly.

FIG. 6 depicts generally at 600 another representative arrangement and scenario for a torque adjustable rotary assembly in accordance with one or more implementations. As with FIG. 5, FIG. 6 represents movement of a magnetic detent assembly 204 of a rotary assembly 128 between different positions indicated as position 602 and position 604 due to operation of an adjuster device. In this example, an adjuster device in the form of an actuator 606 that is connected to magnetic detent assembly 204 and configured to drive the magnetic detent assembly 204 into different positions relative to the rotor 202. Here, the actuator 606 is operable to move the rotary assembly 128 to multiple different positions including at least the positions indicated as position 602 and position 604. In position 602 the magnetic detent assembly 204 is relatively close to the rotor 202 such that spacing 608 between the magnetic detent assembly 204 and rotor 202 is relatively small. Consequently, rotational resistance applied to the rotor 202 is relatively high. On the other hand, in position 604, the magnetic detent assembly 204 is moved away from the rotor 202 such that spacing 608 between the magnetic detent assembly 204 and rotor is relatively large. Thus, in position 604, rotational resistance applied to the rotor 202 is comparatively low. Various other implementations of an adjuster device are also contemplated.

Figure 7A:
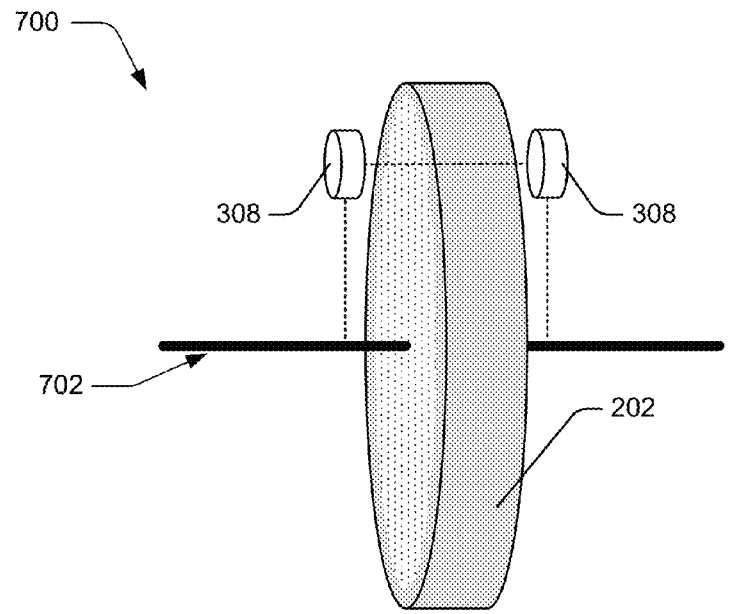
FIGS. 7A and 7B depict respective arrangement of magnets relative to a rotor of a rotary assembly in accordance with one or more implementations.
Figure 7B:
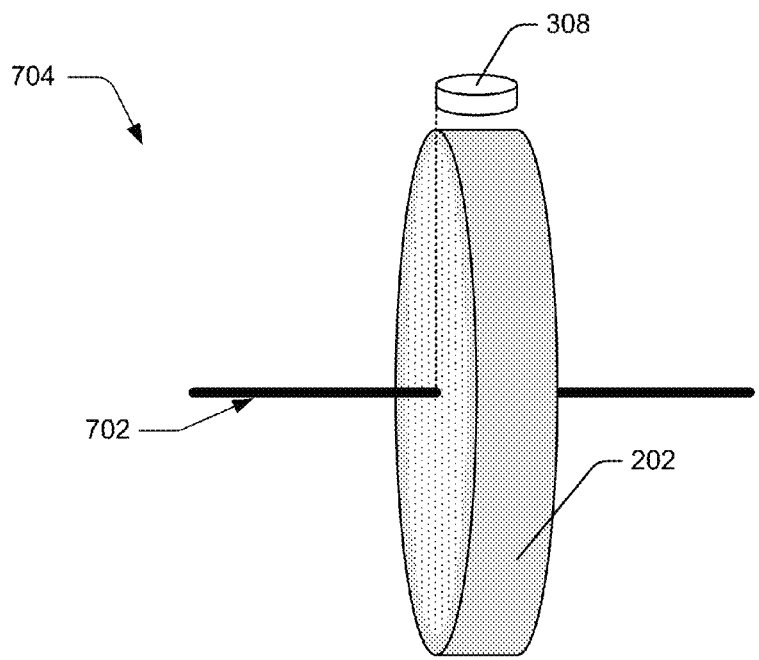

FIGS. 7A and 7B depicts depict respective arrangement of magnets relative to a rotor of a rotary assembly in accordance with one or more implementations. In particular, FIG. 7A depicts generally at 700, an arrangement of a pair of magnets 308 positioned on opposing sides of a rotor 202. In this example, each of the magnets is spaced apart from the rotor 202 on along a respective side of the rotor and centered on a line parallel to axis of rotation 702. The magnets are located radially inside of a rim of the rotor in alignment with the magnetic elements along the side of the rotor. The magnets 308 may be fixed at various locations on the interior of the rim and radially outward from the axis of rotation 702. In an implementation, an adjuster device is provided to selectively adjust spacing for one or both of the magnets in the manner described herein.

FIG. 7B depicts generally at 704, an arrangement of a magnet 308 outside of a rim of a rotor 202. In this example, the magnet is spaced apart a distance from the rim surface of the rotor 202 radially outward from the axis of rotation 702. The magnet is positioned roughly in alignment with a central point of the axis of rotation 702. In this position, the magnet is configured to operate upon multiple magnetic elements that are spaced equally around the rotor, such as gear teeth or spoke elements of the rotor.

The example arrangements of FIGS. 7A and 7B are provided as representative examples. Various other arrangements and combinations are also contemplated. In general, a magnet detent device 204 as discussed in this document is configured to include an arrangement of one or multiple magnets that are aligned to exert magnetic rotational resistance upon a rotor. The arrangement of one or multiple magnets may include magnets on one or both sides, magnets around a rim of the rotor, or a combination of magnets placed alongside the rotor and around the rim.

Having considered example details and procedures for a magnetic detent, consider a discussion of an example system in accordance with one or more implementations.

Example System and Device

Figure 8:
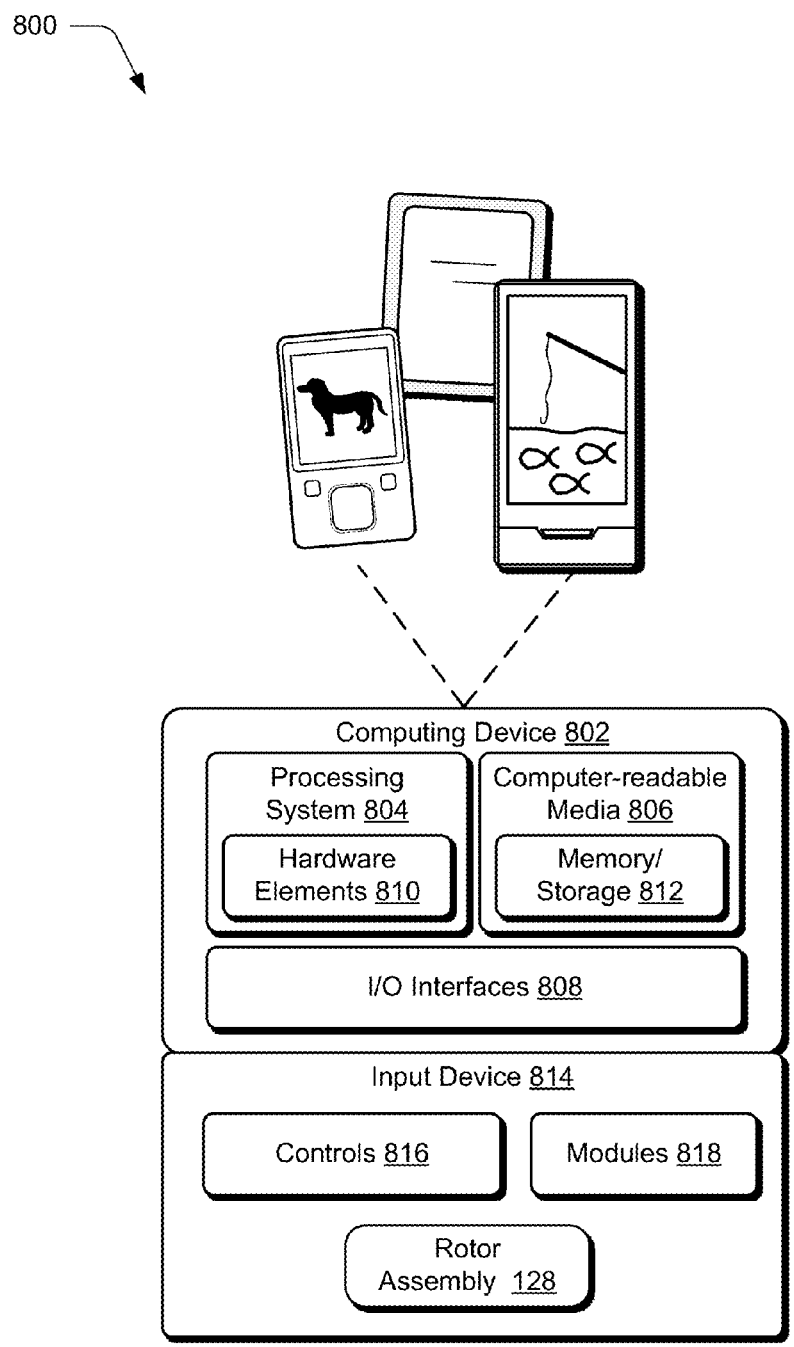
FIG. 8 illustrates an example system that includes an example computing device that is representative of one or more computing systems and/or devices that may implement the various techniques described herein.

FIG. 8 illustrates an example system generally at 800 that includes an example computing device 802 that is representative of one or more computing systems and/or devices that may implement the various techniques described herein. The computing device 802 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways to support user interaction.

The computing device 802 is further illustrated as being communicatively and physically coupled to an input device 814 that is physically and communicatively removable from the computing device 802. In this way, a variety of different input devices may be coupled to the computing device 802 having a wide variety of configurations to support a wide variety of functionality. In this example, the input device 814 includes one or more controls 816. The controls may be configured as pressure sensitive elements, buttons, a trackpad mechanically switched keys, and so forth.

The input device 814 is further illustrated as include one or more modules 818 that may be configured to support a variety of functionality. The one or more modules 818, for instance, may be configured to process analog and/or digital signals received from the controls 816 to recognize inputs and gesture, determine whether an input is indicative of resting pressure, initiate communication with a computing device, support authentication of the input device 814 for operation with the computing device 802, and so on. The input device 814 may also be configured to incorporate a rotor assembly 128 that includes a rotor 202 and magnetic detent device 204 as previously described.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent storage of information in contrast to mere signal transmission, carrier waves, or signals per se. Thus, computer-readable storage media does not include transitory media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

EXAMPLE IMPLEMENTATIONS

Example implementations of techniques described herein include, but are not limited to, one or any combinations of one or more of the following examples:

Example 1

An input device comprising: an interface configured to enable communication of signals; and a rotor assembly operable to generate the signals, the rotor assembly including: a rotor that rotates around an axis of rotation and includes multiple magnetic elements disposed around the rotor; and a permanent magnet arranged radially outward from the axis of rotation and configured to apply a magnetic field to the magnetic elements creating a magnetic detent effect when the rotor is rotated due to changes in rotational resistance produced as the magnetic elements pass through the magnetic field.

Example 2

An input device as described in any one or more of the examples in this section, wherein the multiple magnetic elements are spaced equally around the rotor.

Example 3

An input device as described in any one or more of the examples in this section, further comprising an encoder device configured to capture data regarding rotation of the rotor and convert the data into the input signals for communication to the computing device.

Example 4

An input device as described in any one or more of the examples in this section, wherein the input device comprises a computer mouse and the rotor comprises a scroll wheel integrated with the computer mouse.

Example 5

An input device as described in any one or more of the examples in this section, wherein the magnetic elements are disposed to create multiple discrete points of magnetic resistance around the rotor.

Example 6

An input device as described in any one or more of the examples in this section, wherein the rotor includes a metal gear and the magnetic elements comprise teeth of the metal gear.

Example 7

An input device as described in any one or more of the examples in this section, wherein the teeth of the metal gear create the detent effect under the influence of the magnetic field based on rotational torque differences existing between alignment of the permanent magnetic magnet with teeth and alignment of the permanent magnetic magnet in-between teeth.

Example 8

An input device as described in any one or more of the examples in this section, wherein the magnetic elements are interspersed in an alternating pattern around the rotor with regions having magnetic attraction lower than the magnetic elements Example 9

An input device as described in any one or more of the examples in this section, wherein the alternating pattern creates the changes in rotational resistance as the rotor is rotated.

Example 10

An input device as described in any one or more of the examples in this section, wherein the permanent magnet is spaced apart from the rotor radially outside of a rim of the rotor in a position to align with the magnetic elements disposed around the rotor proximate to the rim.

Example 11

An input device as described in any one or more of the examples in this section, wherein the permanent magnet is spaced apart from the rotor at a position along a side of the rotor parallel to the axis of rotation and radially inside of a rim of the rotor to align with the magnetic elements along the side of the rotor.

Example 12

An input device as described in any one or more of the examples in this section, wherein: the rotor assembly includes the permanent magnet at the position along the side of the rotor and an additional permanent magnet arranged at a corresponding position along an opposing side of rotor; and the magnetic field and changes in rotational resistance are produced by combined effects of the permanent magnet and the additional permanent magnet applied on opposing sides of the rotor.

Example 13

An input device as described in any one or more of the examples in this section, wherein the permanent magnet is arranged at a fixed position relative to the rotor.

Example 14

An input device as described in any one or more of the examples in this section, wherein: the rotor assembly includes an adjuster device connected to the permanent magnet and operable to change a distance of the permanent magnet relative to the rotor; and changing the distance of the permanent magnet relative to the rotor produces a corresponding change in the rotational resistance Example 15

A rotor assembly for an electronic device comprising: a rotor that rotates around an axis of rotation and includes multiple magnetic elements spaced equally around the rotor; a permanent magnet arranged radially outward from the axis of rotation and configured to apply a magnetic field to the magnetic elements creating a magnetic detent effect when the rotor is rotated due to changes in rotational resistance produced as the magnetic elements pass through the magnetic field; and an encoder device configured to capture data regarding rotation of the rotor and convert the data into input signals supplied to control operations of the electronic device.

Example 16

A rotor assembly as described in any one or more of the examples in this section, wherein the rotor comprises a metal gear and the magnetic elements correspond to teeth of the metal gear.

Example 17

A rotor assembly as described in any one or more of the examples in this section, wherein the rotor assembly is configured as a control dial for the electronic device.

Example 18

An apparatus comprising; an interface configured to enable communication of signals; and a rotor assembly operable to generate the input signals, the rotor assembly including: a scroll wheel that rotates around an axis of rotation and includes a metal gear having a plurality of teeth; a permanent magnet arranged radially outward from the axis of rotation outside of a rim of the scroll wheel and configured to apply a magnetic field to the scroll wheel creating a magnetic detent effect when the scroll wheel is rotated through the magnetic field due to different levels of rotational torque produced when the permanent magnet is aligned with one of the plurality of teeth and when the permanent magnet is aligned in-between teeth of the metal gear; an adjuster device connected to the permanent magnet operable to change a distance of the permanent magnet relative to the scroll wheel to vary a level of the rotational torque applied due to the magnetic field; and an encoder device configured to capture data regarding rotation of the scroll wheel and convert the data into the signals.

Example 19

The apparatus as described in any one or more of the examples in this section, wherein the adjuster device is configured to enable multiple different levels of rotational torque corresponding to multiple defined modes of operation of the scroll wheel.

Example 20

The apparatus as described in any one or more of the examples in this section, wherein the encoder comprises an optical encoder configured to detect one or more of scroll wheel position, speed, or distance traveled.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An input device comprising:
   an interface configured to enable communication of input signals; and
   a rotor assembly operable to generate the input signals, the rotor assembly including:
      a rotor that rotates around an axis of rotation and includes multiple magnetic elements disposed around the rotor;
      a permanent magnet arranged radially outward from the axis of rotation and configured to apply a magnetic field to the magnetic elements creating a magnetic detent effect when the rotor is rotated due to changes in rotational resistance produced as the magnetic elements pass through the magnetic field; and
      an adjuster device connected to the permanent magnet and operable to change a distance of the permanent magnet relative to the rotor, producing a corresponding change in the rotational resistance when the rotor is rotated to generate the input signals.

2. An input device as described in claim 1, wherein the multiple magnetic elements are spaced equally around the rotor.

3. An input device as described in claim 1, further comprising an encoder device configured to capture data regarding rotation of the rotor and convert the data into the input signals for communication to a computing device.

4. An input device as described in claim 1, wherein the input device comprises a computer mouse and the rotor comprises a scroll wheel integrated with the computer mouse.

5. An input device as described in claim 1, wherein the magnetic elements are disposed to create multiple discrete points of magnetic resistance around the rotor.

6. An input device as described in claim 1, wherein the rotor includes a metal gear and the magnetic elements comprise teeth of the metal gear.

7. An input device as described in claim 6, wherein the teeth of the metal gear create the detent effect under influence of the magnetic field based on rotational torque differences existing between alignment of the permanent magnetic magnet with the teeth and alignment of the permanent magnetic magnet in-between the teeth.

8. An input device as described in claim 1, wherein the magnetic elements are interspersed in an alternating pattern around the rotor with regions having magnetic attraction lower than the magnetic elements.

9. An input device as described in claim 8, wherein the alternating pattern creates the changes in the rotational resistance as the rotor is rotated.

10. An input device as described in claim 1, wherein the permanent magnet is spaced apart from the rotor radially outside of a rim of the rotor in a position to align with the magnetic elements disposed around the rotor proximate to the rim.

11. An input device as described in claim 1, wherein the permanent magnet is spaced apart from the rotor at a position along a side of the rotor parallel to the axis of rotation and radially inside of a rim of the rotor to align with the magnetic elements along the side of the rotor.

12. An input device as described in claim 11, wherein:
   the rotor assembly includes the permanent magnet at the position along the side of the rotor and an additional permanent magnet arranged at a corresponding position along an opposing side of the rotor; and the magnetic field and changes in the rotational resistance are produced by combined effects of the permanent magnet and the additional permanent magnet applied on opposing sides of the rotor.

13. An input device as described in claim 1, wherein the permanent magnet is arranged at a fixed position relative to the rotor.

14. An input device as described in claim 1, wherein the rotor assembly includes an adjuster device connected to the permanent magnet and operable to change a distance of the permanent magnet relative to the rotor; and changing the distance the input signals are generated when the rotor is rotated at varying distances of the permanent magnet relative to the rotor produces a corresponding change in the rotational resistance when the rotor is rotated to generate input signals.

15. A rotor assembly for an electronic device comprising:

a rotor that rotates around an axis of rotation and includes multiple magnetic elements spaced equally around the rotor;

a permanent magnet arranged radially outward from the axis of rotation and configured to apply a magnetic field to the magnetic elements creating a magnetic detent effect when the rotor is rotated due to changes in rotational resistance produced as the magnetic elements pass through the magnetic field;

an adjuster device connected to the permanent magnet and operable to change a distance of the permanent magnet relative to the rotor, producing a corresponding change in the rotational resistance when the rotor is rotated to generate input signals; and an encoder device configured to capture data regarding rotation of the rotor and convert the data into the input signals supplied to control operations of the electronic device.

16. A rotor assembly as described in claim 15, wherein the rotor comprises a metal gear and the magnetic elements correspond to teeth of the metal gear.

17. A rotor assembly as described in claim 15, wherein the rotor assembly is configured as a control dial for the electronic device.

18. An apparatus comprising;

an interface configured to enable communication of input signals; and a rotor assembly operable to generate the input signals, the rotor assembly including:

a scroll wheel that rotates around an axis of rotation and includes a metal gear having a plurality of teeth;

a permanent magnet arranged radially outward from the axis of rotation outside of a rim of the scroll wheel and configured to apply a magnetic field to the scroll wheel creating a magnetic detent effect when the scroll wheel is rotated through the magnetic field due to different levels of rotational torque produced when the permanent magnet is aligned with one of the plurality of teeth and when the permanent magnet is aligned in-between teeth of the metal gear;

an adjuster device connected to the permanent magnet and operable to change a distance of the permanent magnet relative to the scroll wheel to vary a level the different levels of the rotational torque applied due to the magnetic field when the scroll wheel is rotated to generate the input signals; and an encoder device configured to capture data regarding rotation of the scroll wheel and convert the data into the input signals.

19. The apparatus as described in claim 18, wherein the adjuster device is configured to enable multiple the different levels of the rotational torque corresponding to multiple defined modes of operation of the scroll wheel.

20. The apparatus as described in claim 18, wherein the encoder comprises an optical encoder configured to detect one or more of scroll wheel position, speed, or distance traveled.

* * * * *